United States Patent
Zhou

(10) Patent No.: US 8,317,152 B1
(45) Date of Patent: Nov. 27, 2012

(54) BRACKET

(75) Inventor: Cong-Bing Zhou, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/418,435

(22) Filed: Mar. 13, 2012

(30) Foreign Application Priority Data

Jul. 15, 2011 (CN) .......................... 2011 1 0198445

(51) Int. Cl.
- *A45D 19/04* (2006.01)
- *A47J 47/16* (2006.01)
- *F16M 13/00* (2006.01)
- *F16M 11/02* (2006.01)
- *E04G 3/00* (2006.01)
- *G03B 17/00* (2006.01)

(52) U.S. Cl. ...................... 248/596; 248/397; 248/183.1; 248/185.1; 248/284.1; 248/178.1; 248/122.1; 248/125.9; 248/292.12; 248/292.13; 396/425; 396/428

(58) Field of Classification Search .................. 248/537, 248/205.5, 205.8, 206.2, 596, 397, 419, 183.1, 248/185.1, 284.1, 674, 178.1, 184.1, 122.1, 248/125.9, 183.3–183.4, 292.12–292.13, 248/557, 220.21, 222.51, 222.52; 396/425, 396/428

See application file for complete search history.

(56) References Cited

U.S. PATENT DOCUMENTS

| | | | | |
|---|---|---|---|---|
| 7,021,593 B1* | 4/2006 | Fan | ........................... | 248/206.2 |
| 7,178,771 B2* | 2/2007 | Richter | .................... | 248/205.8 |
| 7,303,171 B1* | 12/2007 | Chen | ........................ | 248/184.1 |
| 7,878,467 B2* | 2/2011 | Chen et al. | ................ | 248/206.2 |
| 8,087,625 B2* | 1/2012 | Chang | ........................ | 248/205.5 |
| 8,091,843 B2* | 1/2012 | Tsai | ............................ | 248/206.2 |
| 2007/0120026 A1* | 5/2007 | Chen | ........................ | 248/205.5 |
| 2007/0120027 A1* | 5/2007 | Chang | ........................ | 248/205.5 |
| 2008/0061199 A1* | 3/2008 | Chen | ........................ | 248/205.8 |
| 2009/0108152 A1* | 4/2009 | Carnevali | .................. | 248/205.5 |
| 2009/0294608 A1* | 12/2009 | Brassard | .................... | 248/205.5 |
| 2011/0073743 A1* | 3/2011 | Shamie | ........................ | 248/537 |
| 2012/0168581 A1* | 7/2012 | Cheng et al. | ............... | 248/206.2 |

* cited by examiner

*Primary Examiner* — Terrell McKinnon
*Assistant Examiner* — Christopher Garft
(74) *Attorney, Agent, or Firm* — Altis Law Group, Inc.

(57) ABSTRACT

A bracket for supporting an electronic device includes a receiving part, a rotating arm, a base, and a locking device. Two opposite ends of the rotating arm are connected to the electronic device and the base. The locking device includes a locking mechanism positioned on the rotating arm, and a locked part positioned on the base. The locking mechanism includes a locking member, an elastic member, and an operating member. The locked part defines a locked position and an unlocked position, the locking member is capable of moving from the locked position to the unlocked position, the elastic member provides an elastic force to keep the locking member in the locked position so that the rotating arm stops moving, the operating member is operable to enable the locking member to overcome the elastic force to move to the unlocked position so that the rotating arm is capable of rotating.

12 Claims, 5 Drawing Sheets

BRACKET

BACKGROUND

1. Technical Field

The present disclosure relates to brackets, and particularly to a bracket for use in mounting an electronic device to a flat surface.

2. Description of Related Art

A tablet computer can be mounted to a desk by a bracket for hands free viewing. The bracket has a rotating mechanism for rotating through an angle for optimum viewing of the screen of the tablet computer. However, the typical rotating mechanism is complex.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
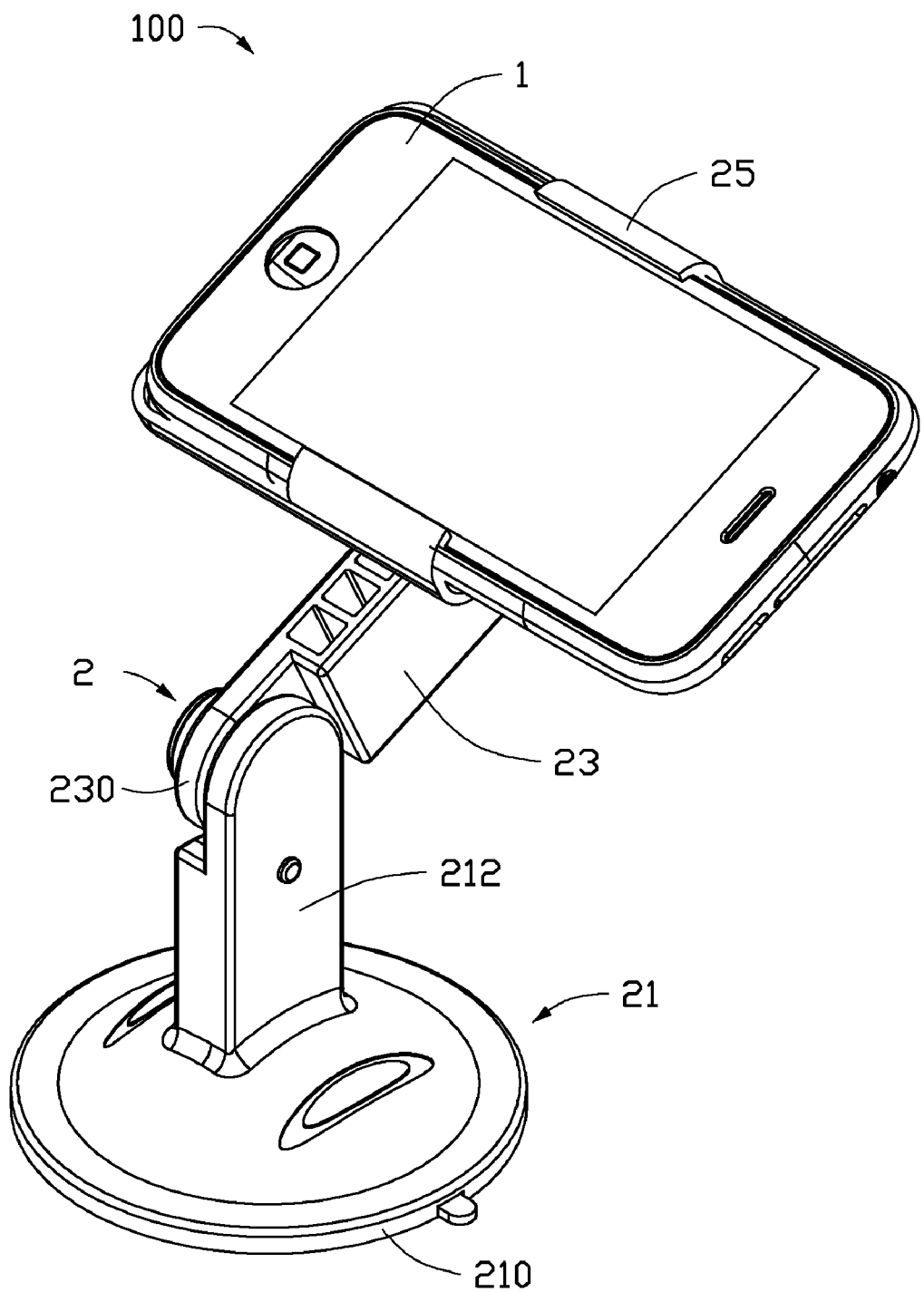
FIG. 1 is an isometric view of an electronic apparatus with an electronic device and a bracket supporting the electronic device.

FIG. 1 shows an embodiment of an electronic apparatus 100 including an electronic device 1, and a bracket 2 for mounting the electronic device 1 to a flat surface, such as a desktop.

Figure 2:
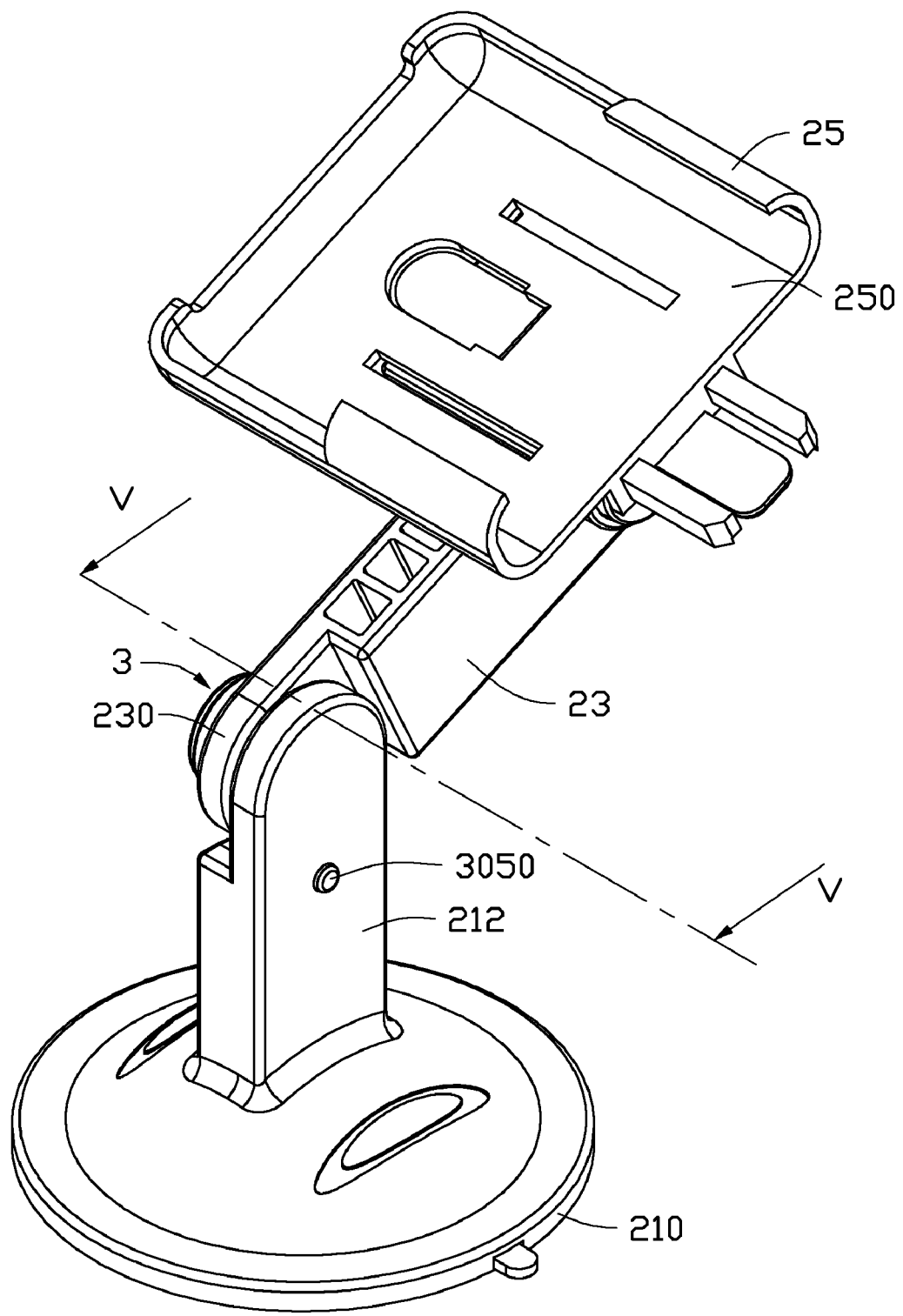
FIG. 2 is an isometric view of the bracket in FIG. 1.
Figure 3:
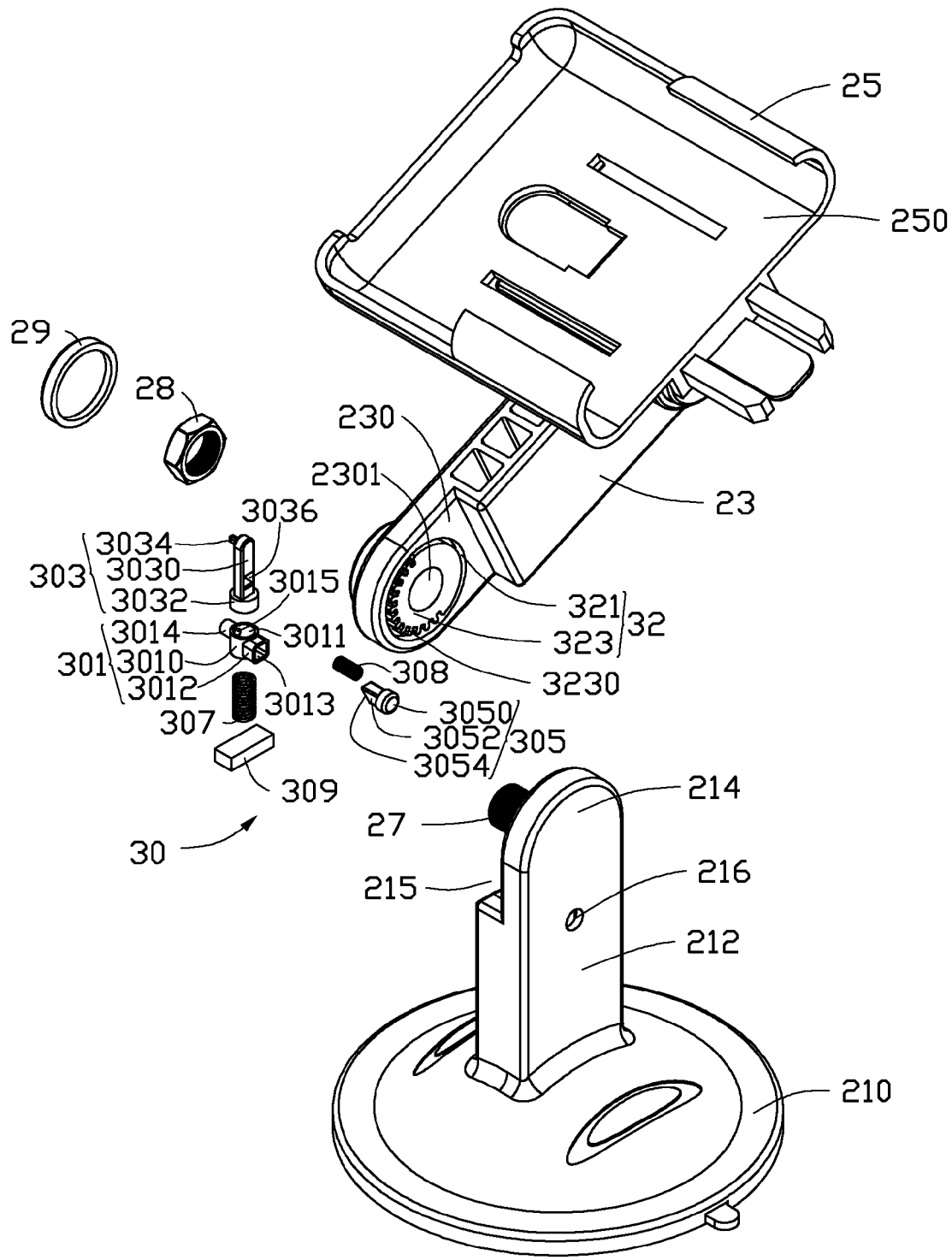
FIG. 3 is an exploded view of the bracket in FIG. 2.
Figure 4:
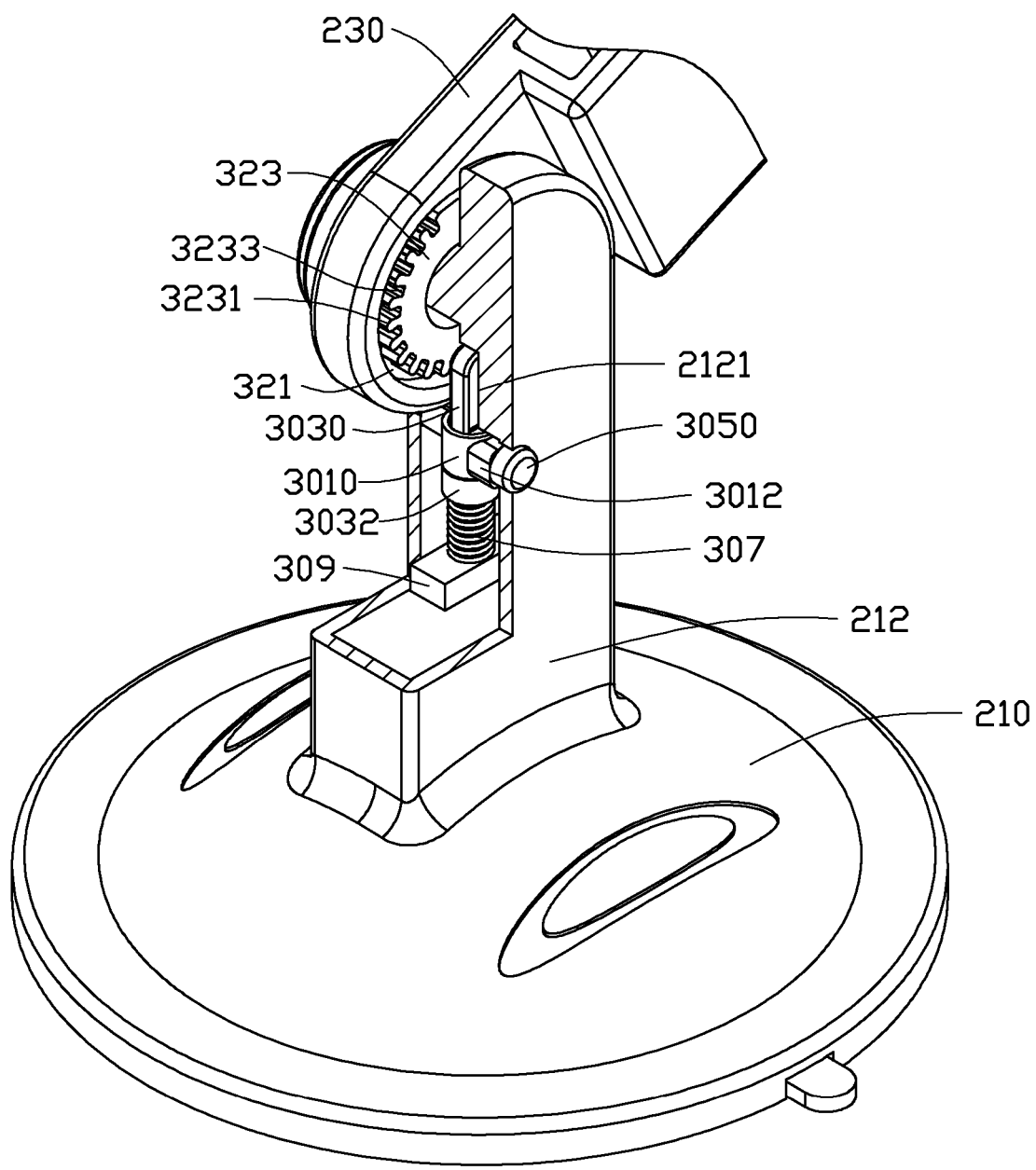
FIG. 4 is a cross-sectional view of a part of the bracket in FIG. 2.

Referring also to FIGS. 2-4, the bracket 2 includes a receiving part 25, a base 21, a rotating arm 23, and a locking device 3. The electronic device 1 is removably received in the receiving part 25. The base 21 is removably attached to the flat surface to secure the electronic device 1 to the flat surface. One end of the rotating arm 23 is rotatably connected to the base 21, the other end of the rotating arm 23 is rotatably connected to the receiving part 25. The locking device 3 is connected between the base 21 and the rotating arm 23 to prevent the rotating arm 23 from rotating with respect to the base 21.

The receiving part 25 defines an opening 250 in which the electronic device 1 may be received, and a clamping member (not label) to secure the electronic device 1 to the bracket 2. The base 21 includes an attaching part 210 removably attached to the flat surface, and a strut 212 protruding from the attaching part 210. The strut 212 is rotatably connected to the rotating arm 23, and the rotating arm 23 can operable rotate with respect to the base 21. The strut 212 defines a guiding hole 216. The end of the strut 212 extends a first connecting part 214. The first connecting part 214 is thinner than the strut 212, and there is a receiving space 215 formed beside the first connecting part 214. One surface of the first connecting part 214 facing to the receiving space 215 defines a recess 2121 and perpendicularly extends a shaft 27. The end of the shaft 27 sets screw threads (not label).

The rotating arm 23 includes a second connecting part 230 connected to the first connecting part 214 and received in the receiving space 215. The second connecting part 230 defines a shaft hole 2301. The shaft 27 is passed through the shaft hole 2301, and screwed with a nut 28. Thus, the rotating arm 23 is secured to the strut 212 and can rotate with respect to the strut 212 to adjust the angle between the rotating arm 23 and the base 21. A cover 29 covers the nut 28 and the end of the shaft 27.

The locking device 3 includes a locked state, and an unlocked state. In the locked state, the rotating arm 23 cannot be rotated with respect to the base 21. Otherwise, in the unlocked state, the rotating arm 23 can be rotated with respect to the base 21 to adjust the angle formed between the rotating arm 23 and the base 21. The locking device 3 includes a locking mechanism 30 positioned in the strut 212, and a locked part 32 positioned on the second connecting part 230. The locking mechanism 30 and the locked part 32 are locked to prevent the rotating arm 23 from rotating with respect to the base 21, and the locking mechanism 30 and the locked part 32 are un-locked to enable the rotating arm 23 rotate with respect to the base 21.

The locking mechanism 30 is mounted in the strut 212, and includes a holder 301, a locking member 303, an operating member 305, a first elastic member 308, a second elastic member 307, and a supporting member 309.

The holder 301 includes a main body 3010, a first installing part 3012, and a second installing part 3014. The first installing part 3012 and the second installing part 3014 extend from opposite sides of the main body 3010. The main body 3010 defines a mounting hole 3011. The first installing part 3012 defines a square hole 3013 through the first installing part 3012. The second installing part 3014 defines a round hole 3015 through the second installing part 3014. The mounting hole 3011, the square hole 3013, and the round hole 3015 communicates with each other. The square hole 3013 and the round hole 3015 are coaxial. The axes of the square hole 3013 is perpendicular with that of the mounting hole 3011.

The locking member 303 includes a basis 3030, a sleeve 3032, and a locking pole 3034. The sleeve 3032 and the locking pole 3034 are positioned on opposite ends of the basis 3030. The basis 3030 is a long and narrow rectangle board, and defines a through hole 3036. The basis 3030 passes through the main body 3010 via the mounting hole 3011, the sleeve 3032 and the locking pole 3034 are positioned on opposite sides of the main body 3010. The through hole 3036 and the square hole 3013 are concentric.

The first elastic element 308 is received in the first installing member 3014 via the square hole 3013 and the round hole 3015. One end of the second elastic member 307 is received in the main body 3010 via the mounting hole 3011. The operating member 305 includes an operating part 3050 and a driving part 3052 with one end connected to the operating part 3050. The driving part 3052 forms an inclined plane 3054 opposite to the operating part 3050. The driving part 3052 is inserted in the basis 3030 via the square hole 3013 and the through hole 3036, and contacts the first elastic member 308. The inclined plane 3054 resists against the basis 3030. The supporting member 309 is a rectangular block. How to assemble the locking mechanism 30 will be described as below.

The supporting member 309 is received and fixed in the strut 212. Secondly, the holder 301, the locking member 303, the operating member 305, the first elastic member 308 and a second elastic member 307 described above are received in the strut 212. At this time, the other end of the second elastic element 307 is in contact with the supporting member 309 to provide an elastic force to support the locking member 303, the basis 3030 extends out of the strut 212 and received in the recess 2121, the operating part 3050 extends out of the strut 212 via the guiding hole 216. Thus, the locking mechanism 30 is mounted to the strut 212.

The locked part 32 defines a sliding groove 321 around the shaft hole 2301, and a rotating tray 323 is formed between the sliding groove 321 and the shaft hole 2301. The rotating tray 323 includes a toothed part 3230 with a plurality of locking space 3233 matched with the locking pole 3034, and communicating with the sliding groove 321. The locking pole 3034 is capable of being inserted into the locking space 3233 of the toothed part 3230 to enable the locking device 3 to enter into the locked state that the rotating arm 23 can not be rotated. Otherwise, the locking pole 3034 is capable of being operably moved from the toothed part 3230 to the sliding groove 321, to enable the locking device 3 to enter into the unlocked state that the rotating arm 23 can be rotated. How to switch from the locked state to the unlocked state of the locking device 3 will be described as below.

Figure 5:
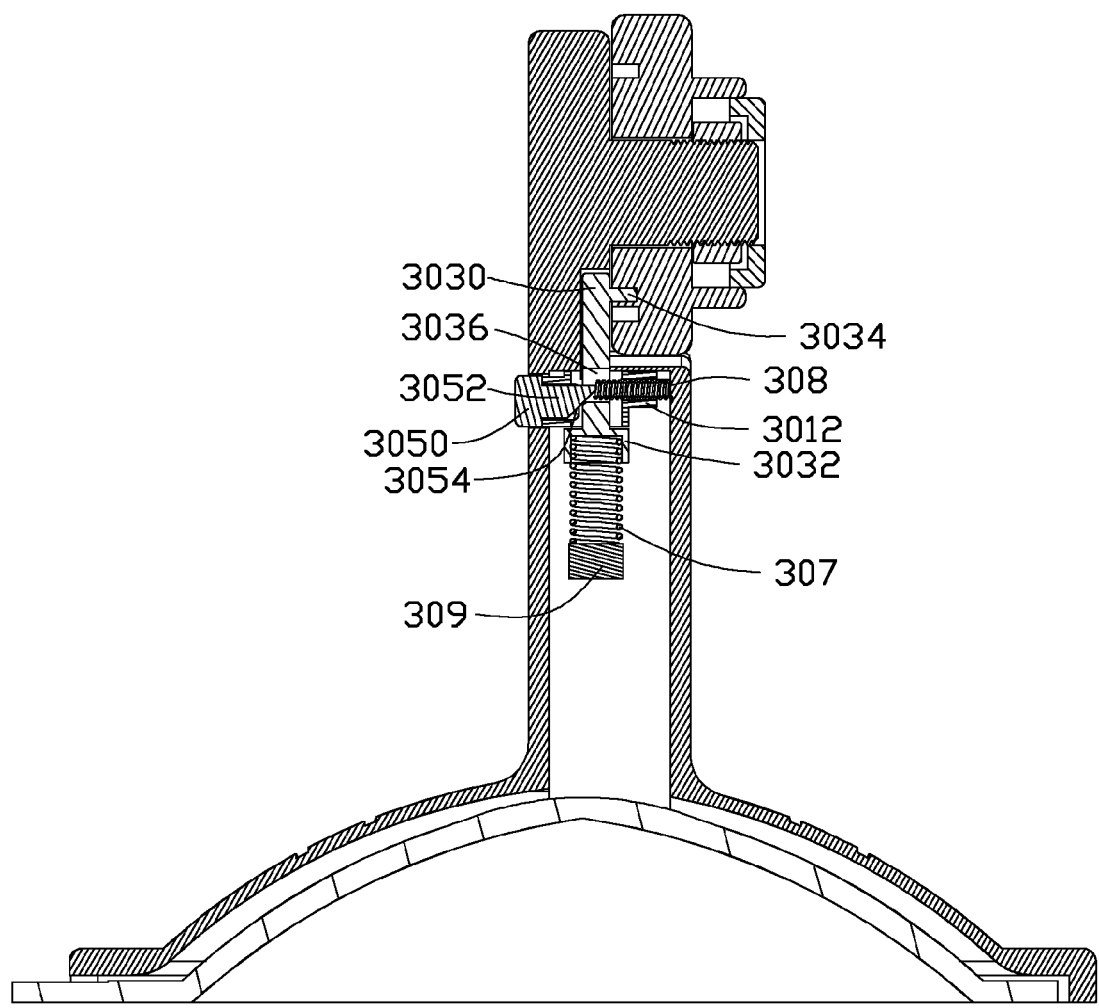
FIG. 5 is a cross-sectional view taken along the line V-V of FIG. 2.

Referring to FIG. 5, to adjust the viewing angle of the electronic device 1 supported by the bracket 2 when the locking device 3 is in the locked state, the user first presses the operating part 3050, the driving part 3052 moves and compresses the first elastic member 308 to generates a first elastic force. The inclined plane 3054 forces the locking member 303 to move away from the second connecting part 230 and the second elastic member 307 is compressed to generate a second elastic force. At this time, the locking pole 3034 is moved to the sliding groove 321, thus the locking device 3 enters into the unlocked state. Secondly, the user rotates the rotating arm 23 to reach the wanted angle between the rotating arm 23 and the base 21. Lastly, when the wanted angle is reached, the user releases the operating part 3050, the operating member 305 is moved away from the locking member 303 under the first elastic force, and the locking member 303 is moved to the second connecting part 230 and inserted into the space 3231 of the toothed part 323 under the second elastic force. At this time, the rotating arm 23 is kept in placed, the locking device 3 enters into the locked state again, and the desired viewing angle is obtained.

It is to be understood, however, that even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A bracket for supporting an electronic device, comprising:
    a receiving part for detachably receiving the electronic device;
    a rotating arm with one end connecting to the receiving part;
    a base rotatably connecting to the other end of the rotating arm; and
    a locking device with a locking mechanism positioned on the rotating arm, and a locked part positioned on the base, wherein the locking mechanism comprises a locking member, an elastic member, and an operating member; the locked part defines a locked position and an unlocked position, the locking member is capable of moving from the locked position to the unlocked position, the elastic member provides an elastic force to keep the locking member in the locked position so that the rotating arm stops moving, the operating member is operable to enable the locking member to overcome the elastic force to move from the locked position to the unlocked position so that the rotating arm is capable of rotating;
    wherein the locking mechanism comprises a holder, the holder defines a first through hole and a second through hole, the axes of the first and the second through holes is perpendicularly with each other, the locking member passes through the holder via the first through hole, the locking member defines a third through hole with axes coaxial with the axes of the second through hole, a part of the operating member is inserted to the locking member via the second and the third through holes, when a force is exerted on the operating member, the operating member is moved along the axes of the second through hole to drive the locking member to move along the axes of the first through hole that the locking member is moved from the locked position to the unlocked position.

2. The bracket of claim 1, wherein the operating member comprises an inclined plane contacting the locking member, the force is exerted on the operating member, the inclined plane drives the locking member to move along the axes of the second through hole.

3. The bracket of claim 1, wherein the locking mechanism further comprises a second elastic member, the second elastic member is placed in a path which the operating member moves along.

4. The bracket of claim 1, wherein the unlocked position is a sliding groove defined in the locked part, the sliding groove is concentric with a rotating track of the rotating arm, the locked position is a plurality of locking space defined in the locked part and communicating with the sliding groove.

5. The bracket of claim 4, wherein the rotating arm defines a shaft hole, a shaft protrudes from the base, the shaft is inserted into the shaft hole to enable the rotating arm to rotatably connect to the base, the sliding groove is around the shaft hole, and the plurality of the locking space are positioned on a part of the rotating arm which is located between the sliding groove and the shaft hole.

6. The bracket of claim 4, wherein the base comprises an attaching part for detachably attaching the bracket to a flat surface.

7. A bracket for supporting an electronic device, the bracket comprising:
    a first bracket body for detachably clamping the electronic device;
    a second bracket body rotatably connected with the first bracket body; and
    a locking device comprising a locking member, an operating member, a holder, and an elastic member;
    wherein the first bracket body comprises a sliding groove and a plurality of locking space, the plurality of locking space communicates with the sliding groove, the locking member comprises a locking pole; an angle formed between first bracket body and the second bracket body is fixed by placing the locking pole into one of the plurality of the locking space, and the elastic member provides an elastic force to keep the locking pole in the one of the plurality of locking space, the operating member is operable to enable the locking member to overcome the force to move the locking pole from the one of the plurality of locking space to the sliding groove so that the locking member is capable of sliding along the sliding groove by rotating the first bracket body with respect to the second bracket body, the holder defines a first through hole and a second through hole, the axes of the first and the second through holes is perpendicular with each other, the locking member passes through the holder via the first through hole, the locking member defines a third through hole with axes coaxial with the axes of the second through hole, a part of the operating member is inserted into the locking member via the second and the third through holes, when a force is exerted on the operating member, the operating member moves along the axes of the second through hole to drive the locking member to move along the axes of the first through hole that the locking member moves from the one of the plurality of the locking space to the sliding groove.

8. The bracket of claim 7, wherein the operating member comprises an inclined plane contacting the locking member, the force is exerted on the operating member, the inclined plane drives the locking member to move along the axes of the second through hole.

9. The bracket of claim 7, wherein the locking device further comprises a second elastic member, the second elastic member is placed in a path which the operating member moves along.

10. The bracket of claim 7, wherein the sliding groove is concentric with a rotating track of the first bracket body.

11. The bracket of claim 10, wherein the first bracket body defines a shaft hole, a shaft protrudes from the second bracket body, the shaft is inserted to the shaft hole to enable the first and the second bracket bodies to rotatably connect to each other, the sliding groove is around the shaft hole, and the plurality of the locking space is positioned on a part of the first bracket body which is located between the sliding groove and the shaft hole.

12. The bracket of claim 11, wherein the second bracket body comprises an attaching part for detachably attaching the bracket to a flat surface.

* * * * *